(12) United States Patent
Fuller

(10) Patent No.: US 12,530,306 B2
(45) Date of Patent: Jan. 20, 2026

(54) PIN-CONSTRAINED DEVICES

(71) Applicant: Cirrus Logic International Semiconductor Ltd., Edinburgh (GB)

(72) Inventor: Jack Fuller, Newbury (GB)

(73) Assignee: Cirrus Logic Inc., Austin, TX (US)

( * ) Notice: Subject to any disclaimer, the term of this patent is extended or adjusted under 35 U.S.C. 154(b) by 305 days.

(21) Appl. No.: 18/305,679

(22) Filed: Apr. 24, 2023

(65) Prior Publication Data

US 2024/0354266 A1  Oct. 24, 2024

(51) Int. Cl.
*G06F 13/16* (2006.01)
*G06F 21/85* (2013.01)

(52) U.S. Cl.
CPC .............. *G06F 13/16* (2013.01); *G06F 21/85* (2013.01); *G06F 2213/0016* (2013.01)

(58) Field of Classification Search
CPC ... G06F 13/16; G06F 2213/0016; G06F 21/85
See application file for complete search history.

(56) References Cited

U.S. PATENT DOCUMENTS

| | | | |
|---|---|---|---|
| 6,331,784 B1 * | 12/2001 | Mason | H03K 19/17768 711/E12.1 |
| 2013/0120032 A1 * | 5/2013 | Quiquempoix | H03M 1/10 327/156 |
| 2021/0397579 A1 * | 12/2021 | Cvejanovic | G06F 13/362 |
| 2022/0376686 A1 * | 11/2022 | Chin | H03K 5/24 |
| 2023/0143302 A1 * | 5/2023 | Chopperla | G06F 13/4282 713/100 |

\* cited by examiner

*Primary Examiner* — Zachary K Huson
(74) *Attorney, Agent, or Firm* — Jackson Walker L.L.P.

(57) ABSTRACT

In an example there is provided a configurable integrated circuit. The configurable integrated circuit comprises a configuration pin, configuration circuitry, and a controller. The configuration pin is for coupling with an external memory device. The configuration circuitry is to determine a resistance value between the configuration pin and a reference voltage. The controller configured to select a configuration mode for the integrated circuit based on the resistance value determined by the configuration circuitry. The configuration mode is one of an internal configuration mode in which the integrated circuit is configured based on data stored in the integrated circuit, and an external configuration mode in which the integrated circuit is configured based on data read from an external memory device coupled to the configuration pin.

10 Claims, 7 Drawing Sheets

PIN-CONSTRAINED DEVICES

TECHNICAL FIELD

The present disclosure relates to the configuration of devices such as integrated circuits.

BACKGROUND

A device, such as an integrated circuit ("IC"), may have a number of pins or terminals (e.g. input/output pins or terminals) for connecting the IC to an external device. Specific functions may be assigned to the pins and may be assigned based on the application of the IC or its function as part of a wider system (e.g. when the IC is part of a host device). The functions of the pins may be based on the type of IC and other components to which it is connected (e.g. such as a bus) and/or the pins may be used to set certain parameters that are related to the IC, the external device and/or the wider system. Since the number of pins associated with an IC is finite, these IC's may be referred to as "pin-constrained IC's."

STATEMENTS OF INVENTION

According to an example there is provided a configurable integrated circuit comprising a configuration pin for coupling with an external memory device, configuration circuitry to determine a resistance value between the configuration pin and a reference voltage, and a controller configured to select a configuration mode for the integrated circuit based on the resistance value determined by the configuration circuitry, the configuration mode being one of an internal configuration mode in which the integrated circuit is configured based on data stored in the integrated circuit, and an external configuration mode in which the integrated circuit is configured based on data read from an external memory device coupled to the configuration pin.

The reference voltage may be a positive voltage, e.g. connected to a positive voltage rail and/or supply.

The configurable integrated circuit may further comprise an I²C interface connected between the configuration pin and the controller.

The controller may be configured to at least one of: (i) determine and adjust the speed at which the interface should be driven based on the resistance value determined by the configuration circuitry, (ii) enable an internal source of current and cause the current on an external path connected to the configuration pin to be supplemented with the internal source of current, and (iii) change the frequency at which a line connected to the configuration pin is driven.

The controller may be configured to select between two configuration modes, each based on data read from the external memory device, based on the resistance value determined by the configuration circuitry.

In some examples, the configuration pin is a first configuration pin and the integrated circuit further comprises a second configuration pin for coupling with an external memory device, wherein the configuration circuitry is configured to determine a resistance value between each configuration pin and the reference voltage.

The first configuration pin may comprise a SDA pin and the second configuration pin may comprise a SCL pin.

The controller may be configured to select between two configuration modes, each based on data read from the external memory device, based on the resistance value determined by the configuration circuitry between each configuration pin and the reference voltage.

Configuring the integrated circuit based on data read from an external memory device may comprise setting or changing the sample rate of the IC, selecting one of a number of filter options, setting or changing an output frequency of a clock generator, setting an address of the integrated circuit, and permitting and/or preventing access to subset of address ranges of the integrated circuit.

According to another example of this disclosure there is provided a carrier comprising: a positive voltage rail; a negative voltage rail; a memory device coupled to the positive and negative voltage rails and comprising an output node; a first resistor coupled between one of said positive or negative voltage rails and the output node of the memory device; and a first path configured to connect the output node of the memory with a first configuration pin of an integrated circuit.

The carrier may comprise a second resistor coupled between one of said positive or negative voltage rails and the output node of the memory device.

The first and second resistors may be coupled between the same positive or negative voltage rail and the output node of the memory device, and the carrier may further comprises a switch configured such that, when the switch is closed, the second resistor is isolated from the output node of the memory device and, when the switch is open, the second resistor is in series with the first resistor between the positive or negative voltage rail and the output node of the memory device.

In one example, the output node of the memory device is a first output node and wherein the memory device comprises a second output node, wherein the carrier comprises a second path configured to connect the second output node of the memory with a second configuration pin of an integrated circuit, and the carrier comprises a second resistor coupled between one of said positive or negative voltage rails and the second output node of the memory device.

The carrier may comprise a third and a fourth resistor, the third resistor being coupled between the output node of the memory and the same positive or negative voltage rail as the first resistor, the fourth resistor being coupled between the output node of the memory and the same positive or negative voltage rail as the second resistor, wherein the carrier further comprises a first switch and a second switch, the first switch being configured such that, when the first switch is closed, the third resistor is isolated from the output node of the memory device and, when the first switch is open, the third resistor is in series with the first resistor between the output node of the memory device and the positive or negative voltage rail to which the first resistor is coupled, the second switch being configured such that, when the second switch is closed, the fourth resistor is isolated from the output node of the memory device and, when the second switch is open, the fourth resistor is in series with the second resistor between the output node of the memory device and the positive or negative voltage rail to which the second resistor is coupled.

The first to fourth resistors may be configured such that, in a first carrier state, the resistance detected at the first configuration pin is 4.7 kΩ and, in a second carrier state, the resistance detected at the second configuration pin is 22 kΩ.

At least one of the first and second resistors may have a resistance value of 4.7 kΩ and at least one of the third and fourth resistors may have a resistance value of 17.3 kΩ.

In some examples, the external memory device comprises the first resistor. In some examples, the first path comprises the data line of an I2C bus. In some examples, the memory device comprises at least one of the resistors. In examples comprising two paths, one of the first path and second paths may comprise the SDA line of an I2C bus and the other may comprise the SCL line of the I2C bus.

According to another example of the disclosure there is provided an arrangement comprising a carrier as described above and an integrated circuit as described above. Therefore, according to this example there is provided an arrangement comprising a carrier and an integrated circuit, the carrier comprising: a positive voltage rail, a negative voltage rail, a memory device coupled to the positive and negative voltage rails and comprising an output node, a first resistor coupled between one of said positive or negative voltage rails and the output node of the memory device, and a first path connecting the output node of the memory with the integrated circuit, and wherein the integrated circuit comprises a first configuration pin coupled to the external memory device via the first path, configuration circuitry to determine a resistance value between the configuration pin and a reference voltage, and a controller configured to select a configuration mode for the integrated circuit based on the resistance value determined by the configuration circuitry, the configuration mode being one of an internal configuration mode in which the integrated circuit is configured based on data stored in the integrated circuit, and an external configuration mode in which the integrated circuit is configured based on data read from an external memory device coupled to the configuration pin.

According to another example there is provided a device (e.g. a host device) comprising the carrier, configurable integrated circuit, and/or the arrangement described above.

DESCRIPTION OF THE DRAWINGS

Examples of this disclosure will be described with reference to the accompanying drawings in which.

DETAILED DESCRIPTION

Figure 1A:
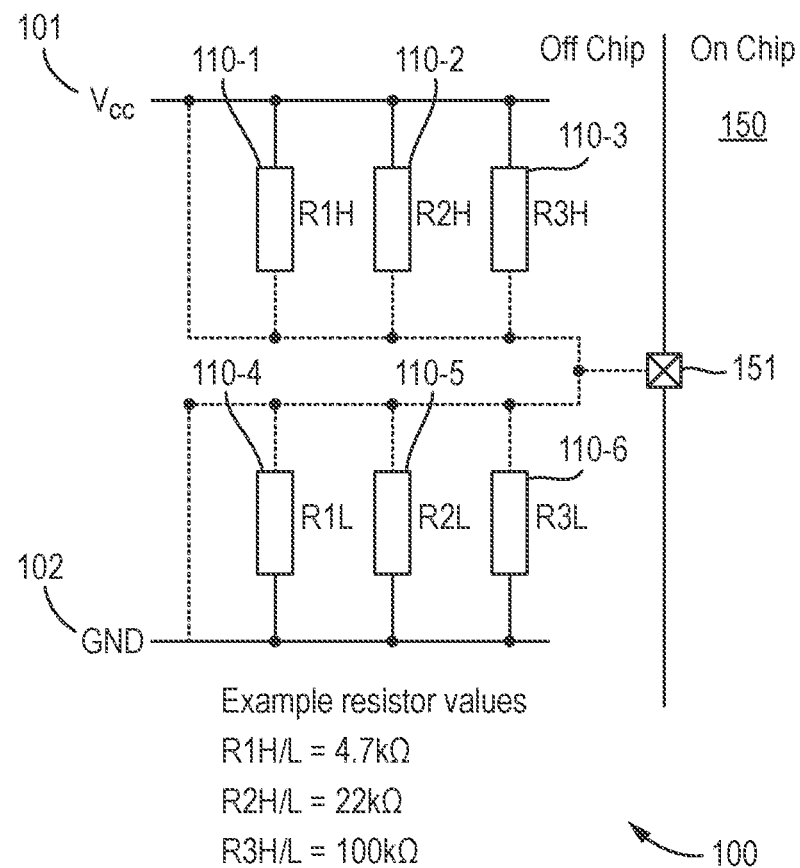
FIG. 1a schematically depicts the choice of resistor for an example carrier arrangement.

Some configurable integrated circuits ("ICs") may be configured without a standard control interface (such as an I²C or SPI interface etc.) or before such a control interface is available. Configuring an IC may comprise assigning or choosing a byte ID for the IC and/or determining an address for the IC so that it can communicate with other entities such as one or more external devices and/or a wider system(s), or indeed configuring any other function, and/or setting a function (such as an audio sample rate or a filter parameter for example). For this purpose, some IC's may be configured via a resistive detection scheme ("RDS"). According to such a scheme, a pin of the IC is connected (e.g. via an arrangement on a carrier such as a printed circuit board (PCB), a laminate substrate, a motherboard or the like) to a resistor that is used to connect the IC to a source of positive voltage ("VCC") (resistive pullup) or to ground ("GND") (resistive pulldown). In the resistive pullup, commonly referred to a 'pullup' arrangement, a resistor is connected between a pin of the IC, hereinafter referred to as "Pin X" for reasons of brevity and clarity of explanation, and VCC, ensuring that the voltage on Pin X is being pulled up to the positive voltage VCC especially when Pin X is not being actively driven by a source. In the pulldown arrangement, a resistor is connected between Pin X and GND, ensuring that the voltage on Pin X is being pulled down to the ground potential especially when Pin X is not being actively driven by a source. The choice of resistance value, and whether it is connected to VCC (to become a pullup resistor) or to GND (to become a pulldown resistor) may be down to the original equipment manufacturer (OEM) in which the pin constrained IC is used or it may be down to the IC manufacturer. To increase the flexibility of this scheme, the IC is able to measure the resistance of the pullup or pulldown resistor. The pullup/pulldown combinations therefore gives rise to 2N different possible configurations, where N is the number of different resistor values that can be distinguished, with the number N being determined by the IC's ability to measure different resistance values. Nevertheless, regardless of which specific resistance and arrangement (pullup or pulldown) is chosen, pulling up or down the voltage on Pin X may be used to place (or keep) the IC in a known state (for example, a default state). Since each one of the 2N possible configurations can give rise to a different configuration of the IC, the OEM or IC manufacturer can therefore choose one from many different arrangements so that a particular IC configuration can be achieved. The IC itself may comprise at least one 'internal' resistor or resistor network of pullup/pulldown resistors and/or there may be at least one 'external' resistor or resistor network of pullup/pulldown resistors and the IC comprises circuitry for measuring the external (or "off-chip") resistance provided by a pullup and/or pulldown resistor as described above and, in response to a particular measured internal and/or external resistance, the IC may be placed in a corresponding configuration. Therefore, an IC, external device and/or the wider system configuration may be a function of the value of the pullup or pulldown resistor.

FIG. 1a schematically illustrates a resistive detection scheme (RDS). According to this arrangement, a carrier 100 (such as a PCB, a laminate substrate, a motherboard or the like) comprises a positive voltage (or potential) rail 101 (or "supply rail") and a negative voltage (or potential) rail 102 (or "supply rail").

FIG. 1a illustrates various "off-chip" components, meaning that these components are provided on the carrier 100 and are external to an integrated circuit, "IC", or "chip" 150. These "off chip" components may be connected to the IC via a single pin 151, i.e. Pin X of the IC, which may be referred to as a configuration pin in that the IC, external device and/or the wider system can be configured according to a particular off-chip resistance sensed by the IC's via the pin 151.

Each of 110-1, . . . , 110-6 indicate a resistor. In the FIG. 1a example, the values of resistors 110-1 and 110-4 are 4.7 kΩ, the values of resistors 110-2 and 110-5 are 22 kΩ, and the values of resistors 110-3 and 110-6 are 110 kΩ but these example resistance values will be understood as exemplary only for the purposes of illustrating some of the principles of this disclosure; they are not to be construed as limiting. FIG. 1a schematically indicates the possible choices of resistors and how they can be placed in a pullup or pulldown configuration, indicated in FIG. 1a by the dotted lines denoting the resistors' respective connections. As explained above, the resistors 110-1, 110-2, and 110-3 are connectable to a positive voltage rail VCC 101 (which is connected to a source of positive voltage) and to the pin 151 and are therefore pullup resistors. The resistors 110-4, 110-5, and 110-6 are connectable between a negative voltage rail (which is connected to ground potential GND 102 in this example) and the pin 151 and are therefore pulldown resistors. It will be appreciated by one of ordinary skill in the art that the respective dotted lines to VCC and GND represent 0Ω (zero ohms) such that pin 151 may be coupled to either VCC or GND. The choice of resistance value and whether it is pulled up or down may depend on the desired configuration of the IC 150, external device and/or the wider system is to adopt.

Figure 1B:
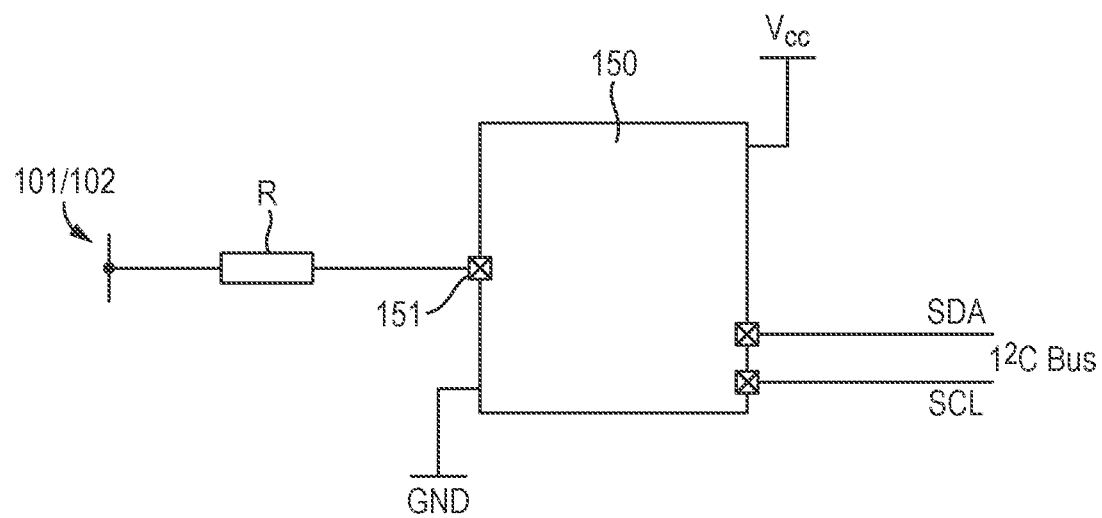
FIG. 1b schematically depicts an example configurable integrated circuit.

FIG. 1b shows the IC 150 connected to a source of positive voltage (VCC), a source of negative, ground, potential (GND) in this example, and a resistor value R which may be connected either to VCC or to GND (indicated at 101/102) and to the pin 151 of the IC 150. FIG. 1b shows how the schematic resistive detection scheme of FIG. 1a may be practically implemented. The IC 150 in this example is also shown connected to an I²C bus (the serial data line "SDA" and serial clock line "SCL") and, accordingly, the IC 150 comprises SDA and SCL pins which may be dedicated I²C pins for this purpose.

As described above, in response to a particular external resistance (depending on the value of R and whether it is connected to VCC or GND, i.e. whether it is a pullup or a pulldown resistance) the IC 150, external device and/or the wider system may be placed in a certain configuration. If more configurations for an IC were desired, it may be possible to include additional resistors connected to the IC (e.g. on the carrier) but this may require the use of another configuration pin for that purpose. However, the area of an IC is often at a premium and using an additional pin may come at an increased die size and/or cost so adding an additional pin(s) may not be desirable in all circumstances. Moreover, in practice, the use of resistors provides for a finite number of configurations (as above: 2N, where N is the number of resistor values that are readily distinguishable) and as N increases this may become increasingly complex to implement. Moreover, with increased numbers of resistors, greater accuracy in the resistors and the means for detecting the off-chip resistance is required. An IC may be connected to an external memory device (e.g. provided on a carrier), as an external memory device may store a plurality of different configurations for the IC, but access to such an external memory device may also come at the cost of using an additional configuration pin. For example, if it is undesirable for the IC to always load a configuration from the output node of an external memory then an additional pin would be needed to determine whether the IC should or should not use the external memory. Whilst this therefore increases the possible configuration options, it also adds cost and complexity to a carrier and may require an additional pin. An IC may also be configured by use of one-time-programmable ("OTP") memory but, due to the nature of OTP memory, once configured it is not then possible to reconfigure the IC. As this may be done during development this may therefore limit the ability to add new functionality or features to the IC at a later date.

It is an aim of the present disclosure to provide a mechanism to configure a pin-constrained device providing additional degrees of freedom to configure the device and without requiring the use of an additional pin to do so.

Figure 2:
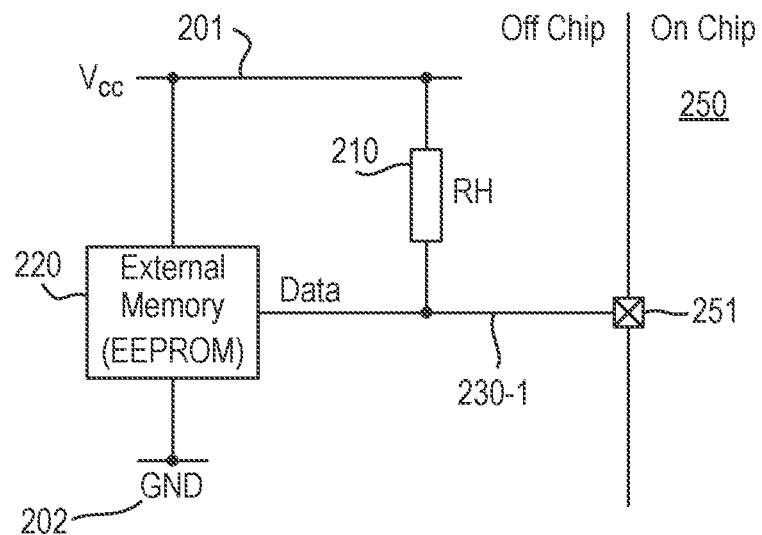
FIG. 2 schematically depicts an example carrier on which a resistor is coupled between a memory device and one of a positive and negative voltage rail.

FIG. 2 shows an example carrier 200 comprising a positive voltage rail 201 and a negative, e.g. ground in this example, voltage rail 202. The carrier 200 of this example also comprises a pullup resistor 210 that is connected between the positive voltage rail 201 and a pin 251 of an integrated circuit 250. The resistor 210 is therefore a pullup resistor. The carrier 200 also comprises a memory device 220, which may be referred to as an external memory device in the sense that it is external to the IC 250 that is connected between the positive and negative voltage rails 201, 202. The carrier 200 comprises a first conductive path 230-1 configured to connect the memory 220 with a first pin 251 of the IC 250 and it will also be appreciated that the memory may be connected between the positive and negative voltage rails 201, 202, and that the resistor may be connected between the positive voltage rail 201 and the pin 251, via conductive paths, denoted by solid lines in FIG. 2. The memory 220 comprises a (not shown) output node and it will be understood that the first conductive path 230-1 connects the output node of the memory 220 with the pin 251. Herein, by "path" it should be understood as comprising any suitable route on which a signal (for example an electrical signal) can travel and, as such, a "path" as used herein may comprise a wire and/or conductive trace and/or an electrical coupling and/or contact.

Advantageously, the FIG. 2 example allows greater flexibility in configuring a device, such as a pin-constrained device like an IC (such as 250). By using an external memory device 220 a number of configurations may be loaded to the IC and the FIG. 2 examples provides such an arrangement that does not require an additional pin (for example compared to only using a resistive detection scheme). For An OEM or IC manufacturer desiring multiple possible configurations, the present disclosure provides much greater configuration flexibility without the expense of using another pin. As such, when the IC detects a certain (pullup or pulldown) resistance coupled to its configuration pin 251, this may trigger the IC to load a particular configuration from the external memory (a "stored configuration"), and a designer and/or OEM or IC manufacturer has the flexibility to set what this configuration may be. Thus, in the FIG. 2 example, when a particular pullup resistance is detected to the IC's pin, this stored configuration may be retrieved from the memory 220 and installed on the IC 250 (to be described in more detail below). Of course, the skilled person will understand that the resistor 210 being depicted in a pullup configuration (coupled to the positive voltage rail 201) is an example only, and that the pullup resistor 210 of FIG. 2 may be replaced by a pulldown resistor as will be understood by one of ordinary skill in the art.

The external memory 220 may comprise a read-only memory, for example an electrically erasable programmable read-only memory ("EEPROM"). Alternatively, the external memory may comprise any other suitable memory device. Any memory device may be coupled to the integrated circuit via one or two paths or conductive lines. In the example of two lines, these may comprise I²C bus lines to be described later.

Figure 3:
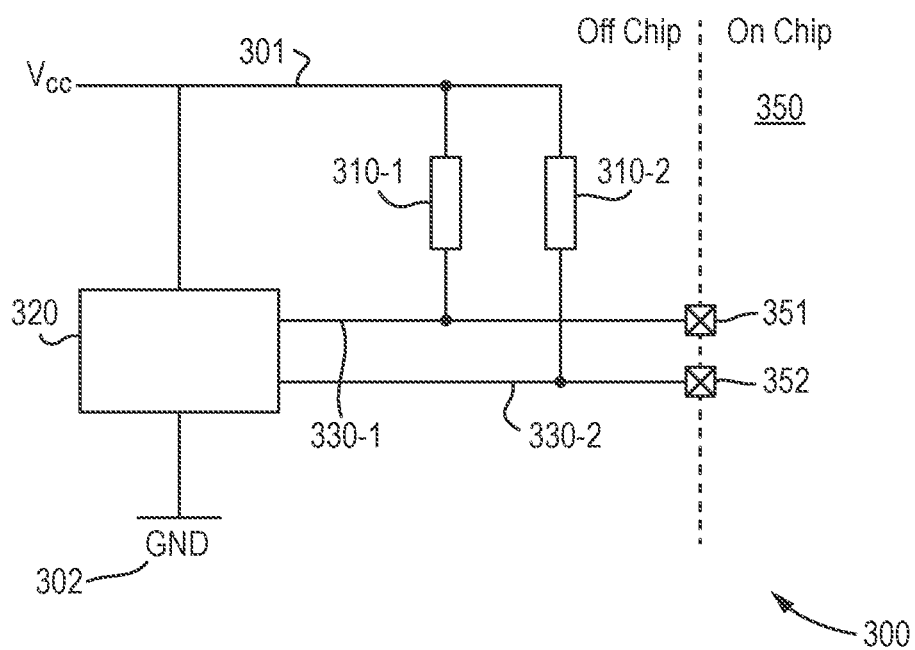
FIGS. 3-5 schematically depict alternative arrangements of a carrier.

FIG. 3 shows an example carrier 300 comprising a positive voltage rail 301 and a negative voltage rail 302 (ground in this example). Like the FIG. 2 example, the carrier 300 of FIG. 3 also comprises a first pullup resistor 310-1 that is connected between the positive voltage rail 301 and a first configuration pin 351 of an integrated circuit 350, but the comprises a second pullup resistor 310-2 that is connected between the positive voltage rail 301 and a second configuration pin 352 of the IC 350. Both the example plurality of pullup resistors of FIG. 3 may be replaced by respective pulldown resistors, or alternatively, one of the said pullup resistors may be replaced by a pulldown resistor as will be understood by one of ordinary skill in the art. The FIG. 3 arrangement should therefore be understood to disclose (i) two pullup resistors, (ii) two pulldown resistors, or (iii) one pullup and one pulldown resistor, respectively connected to two configuration pins 351, 352 of an IC 250.

The carrier 300 also comprises a memory device 320. As for the carrier 200 of the FIG. 2 example, the memory 320 is connected between the positive and negative voltage rails 301, 302, and the carrier 300 comprises a first conductive path 330-1 configured to connect (a first output node of) the memory 320 with a first pin 351 of the IC 350. The carrier 300 also comprises a second conductive path 330-2 configured to connect (a second output node of) the memory 320 with a second pin 351 of the IC 350. Unlike the FIG. 2 example, the carrier 300 of the FIG. 3 example is therefore configured to connect to an IC 350 having two pins 351, 352 available for its configuration.

The FIG. 3 example, where the IC 350 has two configuration pins 351, 352, may take advantage of the fact that some interfaces use one or more data lines that are pulled high by a resistor. For example, an I²C bus has pullup resistor (by design) on both of its SCL and SDA lines. Therefore, the two lines (paths) 330-1 and 330-2 may each comprise a line (e.g. a data line) of an interface or a bus protocol. In a specific example, the paths 330-1, 330-2 may comprise the SDA and SCL lines of the I2C bus. In this example, the configuration pins 351, 352 may comprise SDA and SCL pins. In this way, advantageously, the FIG. 3 arrangement can be used with the existing pin structure of an I²C-compatible IC and therefore this arrangement is implementable without requiring two additional dedicated configuration pins. The resistors 310-1, 310-2 may each have a resistance value of approximately 4.7 kΩ for example. This example value may take advantage of the compatibility of a recommended pullup resistance of 4.7 kΩ associated with each of the SDA and SCL lines of the I²C bus.

The carrier 300 in the FIG. 3 example may therefore comprise at least part of an I²C bus and/or one of the ICs described herein may comprise an I²C interface (to be described later). In the example where the IC 350 is provided on an I²C bus, it may comprise an identifier (e.g. 7 bits of a byte ID) to allow it to be identified by one or more other components on the bus (which may comprise their own IDs) on a transaction-by-transaction basis. The 8th bit in such a byte ID may allow the IC to be read-from or written-to. Whilst the byte ID may be fixed in some examples it may be variable and, one example of configuring the IC according to this disclosure via the arrangement depicted in FIG. 2 or 3 may be assigning a byte ID to the IC. In other words, when a certain value of resistive pullup or pulldown is detected on the configuration pin (or on the configuration pins) of an IC, a byte ID may be assigned to the IC which may be retrieved from the external memory 220, 320 when that value of resistance is detected on the pin(s). In another example, however, in response to a particular external resistance, one or more settings of the IC may be configured (e.g. loaded into the IC's memory registers, which may be retrieved from the external memory 220, 320). These settings may be loaded (or changed) and may include for example one or more of: setting or changing the sample rate of the IC; selecting one of a number of filter (e.g. audio filtering) options; setting or changing an output frequency of the clock generator; setting the IC address (as described previously); setting and/or changing a setting (for example a security setting of the IC); and permitting and/or restricting access to a set of memory or control registers of the IC (e.g. controlling at least one feature of the IC), for example so that any malware running on a host processor cannot access the IC to override a setting. In the latter example this may mean that the regular interface to the device (e.g. I²C, SPI etc) can be set to disallow access to certain areas of a device. Compared to a resistive detection scheme as discussed above, the external memory device gives a lot of flexibility to set these restrictions, and as this is either in hardware or on an external memory device and therefore not accessible over the control interface, it can be secure against malicious transactions. Any one of these example settings may be retrieved and loaded from the external memory 220, 320.

Figure 4:
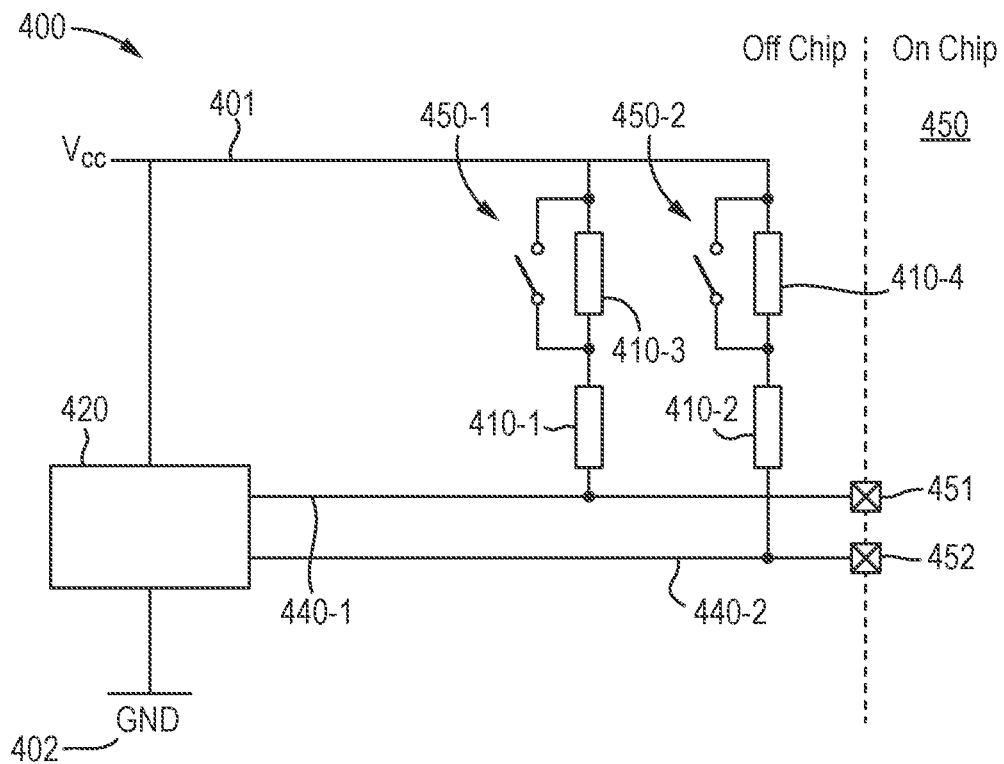

FIG. 4 shows an example carrier 400 that builds on the FIG. 3 configuration. Accordingly, like features are denoted by like reference numerals so, for example, reference numeral 401 denotes a positive voltage rail as for 301 etc. The carrier 400 of this example also comprises third and fourth pullup resistors, 410-3 and 410-4, each of which are respectively associated with switching circuits 450-1 and 450-2. Each of the four resistors 410-1, . . . , 410-4 are therefore connected between the positive voltage rail 401 and one of two configuration pins 451, 452 of an IC 450. The switching circuits each comprise respective switches and have the purpose of being configurable in first and second states by virtue of their switches being closed or open. More specifically, the first switching circuit 450-1 is configured to bypass the third resistor 410-3 when its switch is closed and, when its switch is open, configured to connect the first and third resistors 410-1 and 410-3 in series between the positive voltage rail 401 and a first configuration pin 451 of the IC 450. Similarly, the second switching circuit 450-2 is configured to bypass the fourth resistor 410-4 when its switch is closed and, when its switch is open, configured to connect the second and fourth resistors 410-2 and 410-4 in series between the positive voltage rail 401 and a second configuration pin 452 of the IC 450. This arrangement therefore enables two resistances (that could have the same or different resistance values) to be applied to each respective pin. Accordingly, the first and second resistors 410-1, 410-2 may therefore have the same resistance values. The third and fourth resistors 410-3, 410-4 may have the same resistance values, and these may be the same as the values of the first and second resistors 410-1, 410-2 or may be different to the first and second resistors 410-1, 410-2 values. This arrangement may therefore ensure that the same resistance value is detected at each configuration pin 451, 452 or that the resistance at each pin may be different (e.g. due to the first and second, and third and fourth, resistors having different resistances), depending on the example.

The first to fourth resistors 410-1, . . . , 410-4 have first to fourth resistance values, respectively. The carrier 400 may be in a first state (in which the first and second switches are closed) in which a first and second resistance value is detected at each of the respective pins and a second state (e.g. in which the first and second switches are open) in which a third and fourth resistance value is detected at each of the respective pins 541, 542. The first and second resistance values, detected at the first and second pins when the carrier is in the first state (with the switches closed), will be respectively the values of the first and second resistors as the third and fourth resistors are bypassed in this state. Of course, if the first and second resistance values are the same then the same resistance value will be detected at each pin in this state. The third and fourth resistance values detected at the first and second pins in the second state (with the switches open) will be, respectively, the sum of the first and third resistances (at the first configuration pin) and the sum of the second and fourth resistance (at the second configuration pin). Of course, if the first and second resistance values are the same, and if the third and fourth resistance values are the same, then the same resistance values will be detected at each configuration pin.

Each of the resistance values detected at each pin may correspond to a different configuration being loaded from the external memory 420. For instance, a first combination, or pair, of pullup or pulldown resistance values being detected at the first and second configuration pins may correspond to a first configuration (e.g. "Configuration A") being retrieved from the external memory and loaded to the IC 450, and a second combination, or pair, of pullup or pulldown resistance values being detected at the first and second configuration pins may correspond to a second configuration (e.g. "Configuration B") being retrieved from the external memory and loaded to the IC 450. Of course, in examples where the first and second resistance values are the same, and where the third and fourth resistance values are the same, a first resistance value detected at each configuration pin may correspond to the first configuration being retrieved and loaded and a second resistance value detected at each configuration pin may correspond to the second configuration being retrieved and loaded.

By virtue of one example to illustrate this, the first and second resistors 410-1, 410-2 may each have a resistance value of 4.7 kΩ and the third and fourth resistors 410-3, 410-4 may each have a resistance value of 17.3 kΩ. In this example, when both switches are in the closed position, both of the third and fourth resistors 410-3, 410-4 are bypassed so the total resistance at both of the pins 451, 452 and therefore measured by the IC (measured on chip) will be the respective resistances of the first and the second resistors 410-1, 410-2 only—e.g. 4.7 kΩ in this example. However, when both switches are open the first and third resistors 410-1, 410-3 are in series, and the second and fourth resistors 410-2, 410-4 are in series, so the total resistance at both of the pins 451, 452 will be 22 kΩ.

Whilst these resistance values are exemplary and non-limiting, they may be useful in the example where the two lines 440-1 and 440-6 are part of an I²C bus (and the pins 451 and 452 comprising SDA and SCL pins), given the compatibility of these resistance values with the pullup resistances of the SDA and SCL lines of an I²C bus. Using these two resistances may therefore allow two configurations to be loaded from the external memory 420 when the carrier arrangement 400 comprises an I²C bus, like the example of FIG. 3.

The carrier arrangement may be in a further state where one of the switches 450-1 is closed and the other switch is open 450-2. In each state, different resistance may be detected at each configuration pin 451, 452. The states that the carrier could adopt, and the resistance values across each pin based on the values of the first to fourth resistors 410-1, . . . , 410-4, being denoted by R1, . . . , R4, are summarised in the below table:

TABLE 1 states of the carrier 400 and resistances at each configuration pin 451, 452

| | Carrier state 1 | Carrier state 2 | Carrier state 3 | Carrier State 4 |
|---|---|---|---|---|
| Switch 1 | Closed | Open | Closed | Open |
| Switch 2 | Closed | Open | Open | Closed |
| Resistance value detected at configuration pin 451 | R1 | R1 + R2 | R1 | R1 + R2 |
| Resistance value detected at configuration pin 452 | R2 | R3 + R4 | R3 + R4 | R2 |
| Configuration to be retrieved and loaded from the external memory | Configuration A | Configuration B | Configuration C | Configuration D |

It will be appreciated that regardless of what state the carrier is in, a particular configuration value may be loaded depending on the resistance detected across each pin 451, 452. Four possible configurations may therefore be retrieved and loaded from the memory 420 (labelled A-D in the table above).

It will furthermore be appreciated that more carrier states will be readily envisaged since each resistor may be a pullup or pulldown resistor, the carrier may comprise combinations of pullup or pulldown resistors, for example a pullup resistor may be connected to a first configuration pin and a pulldown resistor may be connected to a second configuration pin.

Figure 5:
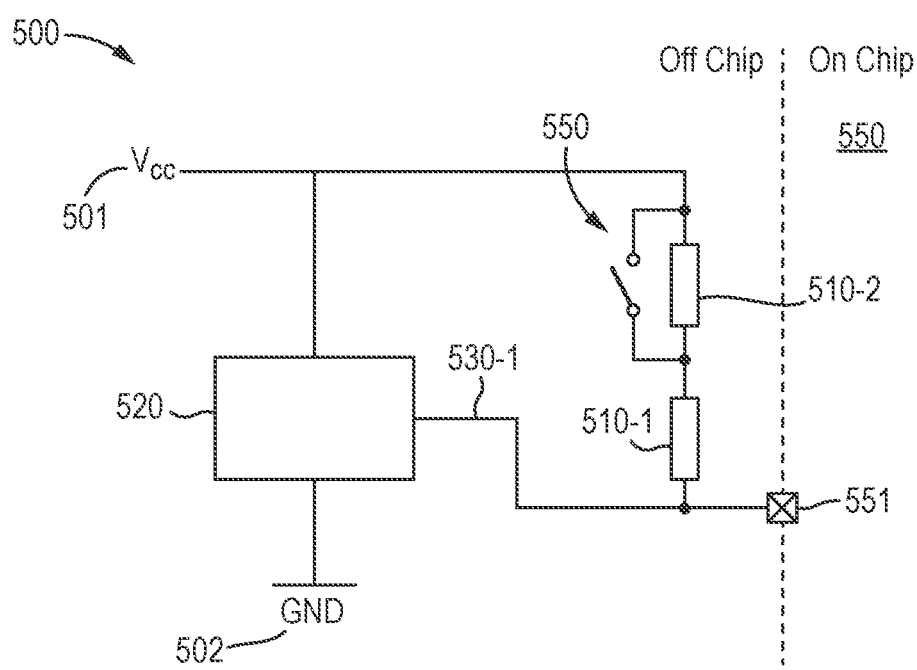

FIG. 5 illustrates the same arrangement of the carrier as for FIG. 4 but for a single configuration pin integrated circuit and will not be described in the same level of detail for brevity, as like features are described with like reference numerals with respect to FIG. 4. Like FIG. 4, it will be appreciated that the carrier may be in a first state (in which the switch is closed) in which a first resistance value is detected at the pin and a second state (in which the switch is open) in which a second resistance value is detected at the pins. As for FIG. 4, each of the first and second resistance values may correspond to a different configuration being loaded from the external memory 520 into the IC 550. For instance, a first pullup resistance being detected at the pin 551 may correspond to a first configuration (e.g. "Configuration A") being retrieved from the external memory and loaded to the IC 550, and a second pullup resistance being detected at the pin may correspond to a second configuration (e.g. "Configuration B") being retrieved from the external memory and loaded to the IC 550.

FIGS. 4 and 5 therefore illustrate examples where two (or more) configurations can be retrieved from an external memory and loaded to an IC where the IC has one configuration pin available (FIG. 5) and two configuration pins available (FIG. 4).

Figure 6:
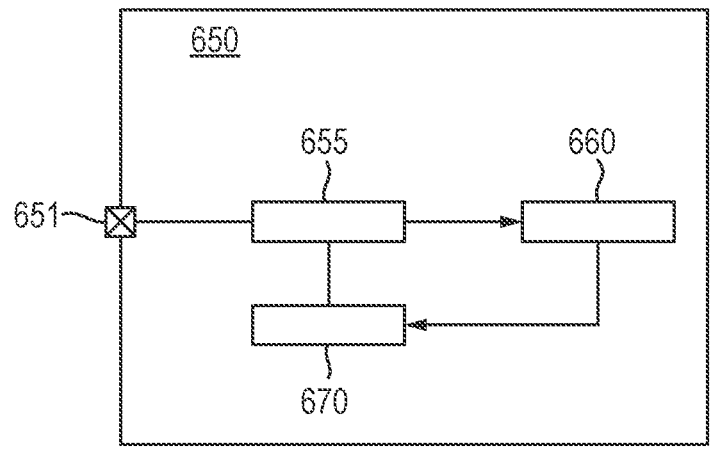
FIGS. 6 and 7 schematically depict configurable integrated circuits having one and two configuration pins, respectively.

FIG. 6 illustrates an example integrated circuit 650 having one configuration pin 651 configured to couple with an external memory device, the IC 650 being compatible with the carriers 200 and 500 depicted in FIGS. 2 and 5. The integrated circuit 650 comprises configuration circuitry (which may also be referred to as resistive detection, or determination, circuitry) 655 configured to detect the presence and value of an external resistance (e.g. at the configuration pin 651), a controller (or processor) 660, which may comprise a state machine, and an interface 670. The resistance detected by the configuration circuitry 655 may be provided according to the arrangement of FIG. 2 or 5. The IC 650 may comprise a resistor. The configuration circuitry 655 may comprise a resistor. The configuration circuitry 655 may be configured to determine the resistance between the configuration pin 651 and a reference voltage (which may be VCC or GND). The configuration circuitry 655 may be configured to measure the current. The controller 660 is in communication with the configuration circuitry 655 and is configured to both load an external configuration from an external memory device (e.g. 220, 420) and configure the IC 650 according to that loaded configuration. The controller 660 is configured to select a configuration mode for the IC 650 based on the resistance value determined by the configuration circuitry 655, the configuration mode being one of an internal configuration mode in which the IC 650 is configured based on data stored in the IC, and an external configuration mode in which the IC 650 is configured based on data read from an external memory device coupled to the configuration pin 651. The determined resistance may be one of two possible values (e.g. if the FIG. 4 carrier arrangement was used with the IC 650). The detected resistance may be a pullup resistance or it may be a pulldown resistance.

The IC 650 (for example, the configuration circuitry 655) may comprise a field-effect transistor (FET), for example a p-channel MOSFET (PMOS) and/or an n-channel MOSFET (NMOS), depending on whether the resistor coupled to the output node of the memory device is a pullup and/or a pulldown resistor. Such an FET may be connected to a switch and may be used to detect whether the resistor coupled to the external memory is a pullup or a pulldown resistor and/or to determine the value of the resistance applied to one (or more) configuration pins of the IC. Indeed, any of these components (the resistor, the resistive detection circuitry, one or more FETs etc.) may be part of the configuration circuitry 655 and/or the controller 650.

Figure 8:
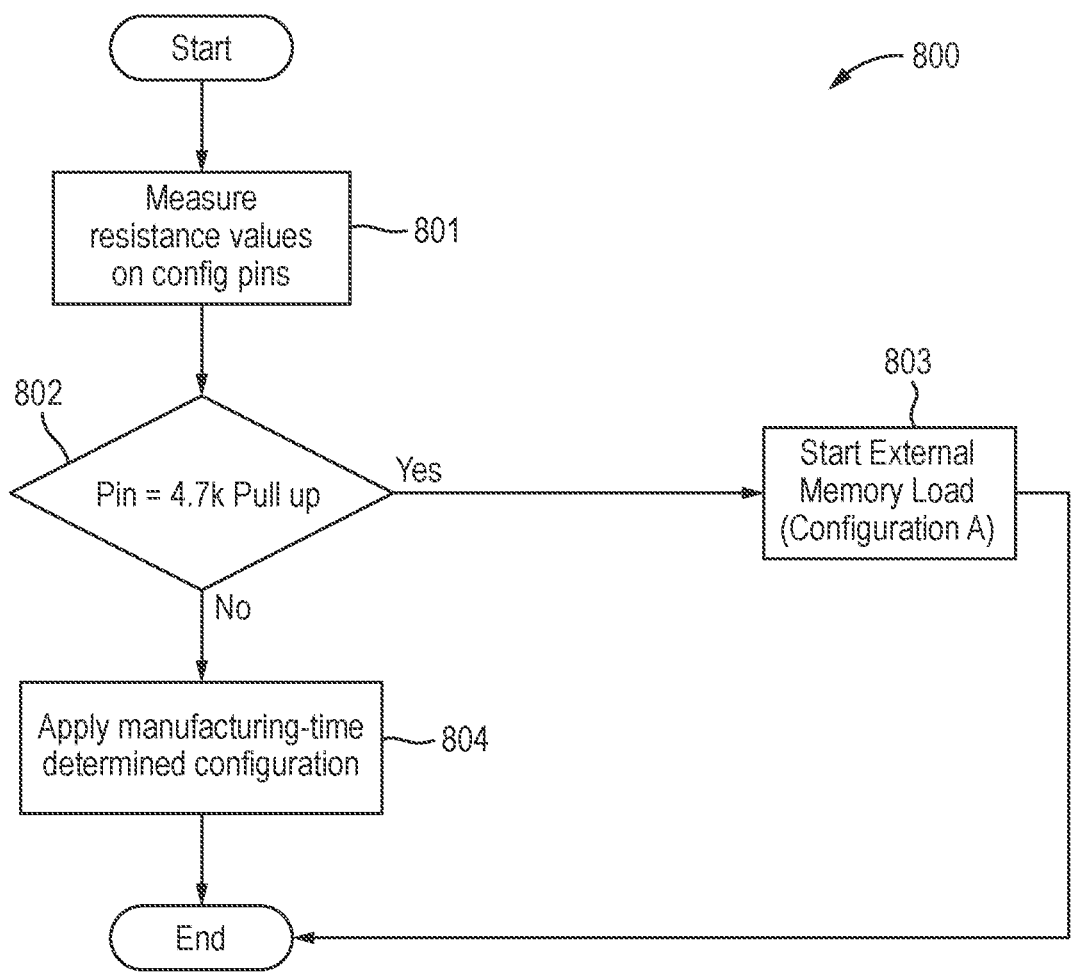
FIGS. 8-10 schematically depict flowcharts of processes which the controllers (of the configurable integrated circuits) of the examples herein may be configured to perform.

FIG. 8 shows a process 800 that the IC 650 may be configured to perform. According to the process, at 801, the resistance value on the pin 651 is determined (e.g. by the configuration circuitry 655) and, at 802, it is determined whether the value on the configuration pin 651 is a first pullup resistance (illustrated as 4.7 kΩ in this example). If it is then, at 803, a configuration ("Configuration A" in FIG. 8) is loaded from the external memory (e.g. 220), for example the controller 660 may load the configuration from the external memory and configure the IC 650 based on this loaded configuration. If the resistance is not equal to the value of the first pullup resistance then, at 804, another configuration is loaded to the IC 650 (e.g. by the controller 660) and this may be a configuration determined during the manufacture of the IC 650. Note that the value of 4.7 kΩ is used purely for exemplary purposes. It will be understood that this value could be a resistance value other than 4.7 kΩ and it may be a pullup or a pulldown resistance. For example, the resistance value may be any of the ones depicted in FIG. 1*a*.

Figure 9:
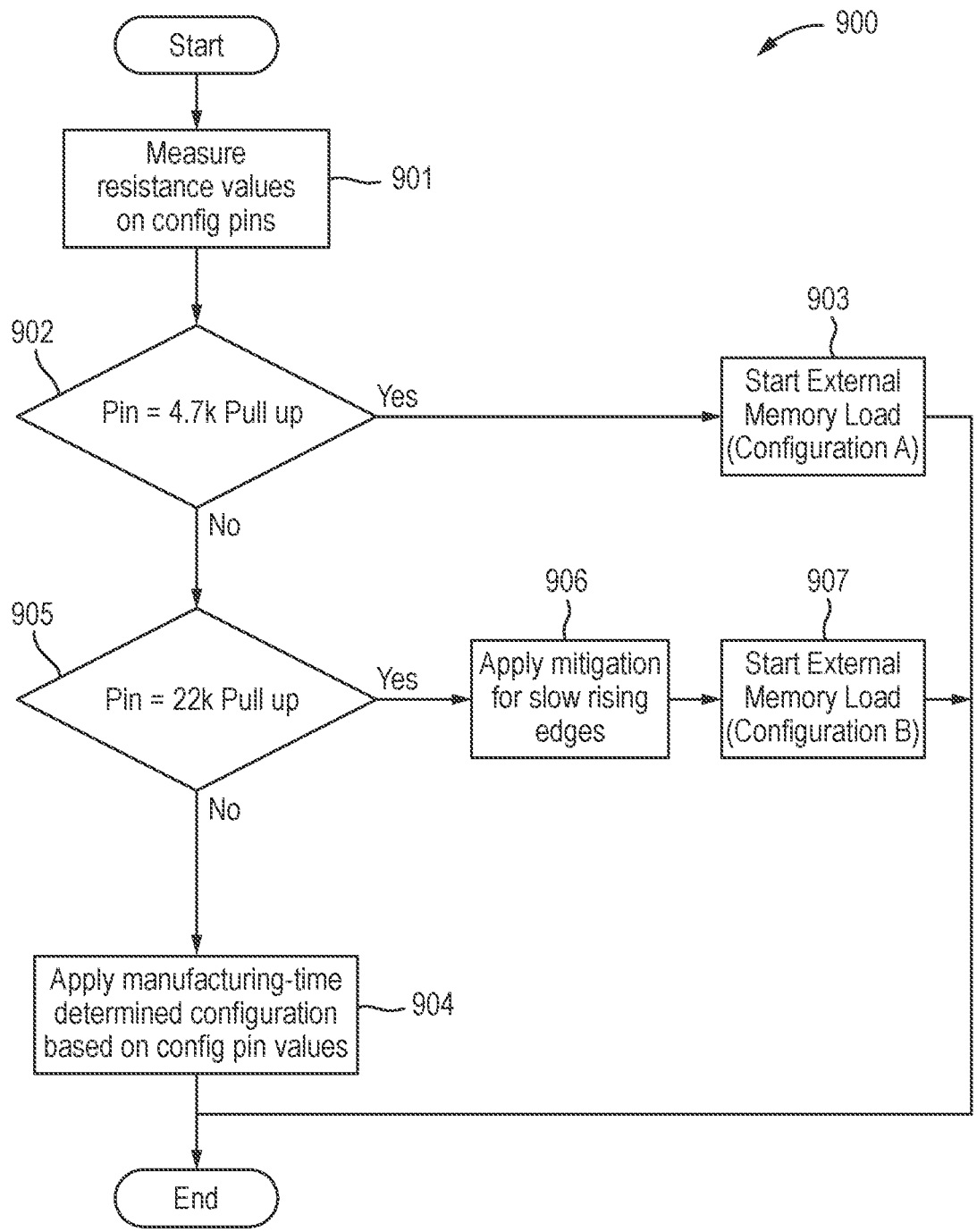

FIG. 9 shows a process 900 that the IC 650 may be configured to perform, where like blocks are depicted with like reference numerals compared to FIG. 8 (so blocks 802 and 902 should be viewed as equivalent etc.). Unlike the FIG. 8 process, at 902, if a first resistive pullup value (4.7 kΩ in this example) is not detected then, at block 905 it is determined if a second resistive pullup value (22 kΩ in this example) is detected at the pin 651. If so, at 907, a second configuration ("Configuration B" in FIG. 9) is loaded from the external memory. The FIG. 9 process may be performed by an IC connected to the carrier arrangement shown in FIG. 5. enabling two resistances to be applied to the configuration pin of the IC by virtue of the switching circuit 550. Block 906 indicates that slow rising edges may be mitigated as part of this process which will be described below. Note that as above the values of 4.7 kΩ and 22 kΩ are used purely for exemplary purposes. It will be understood that these values could be a resistance values other than 4.7 kΩ and 22 kΩ may be pullup or pulldown resistances. For example, the resistance value(s) may be any of the ones depicted in FIG. 1*a*.

Figure 7:
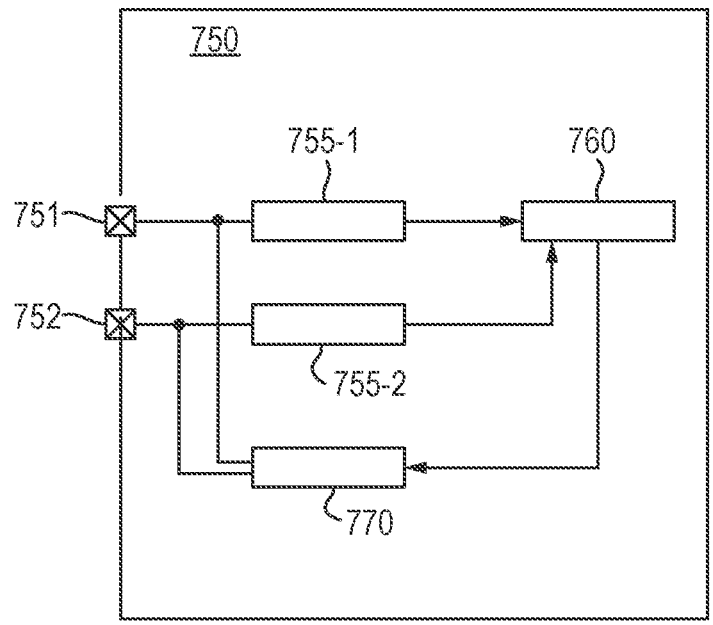

FIG. 7 illustrates an example integrated circuit 750 having two configuration pins 751, 752, each for coupling with an external memory device, first and second configuration circuitry 755-1 and 755-2, a controller 760, and an interface 770. As for previous carriers, like features will be denoted with like reference numerals with respect to the IC 650 of FIG. 7 and so all features of the IC 750 will not be discussed in the same level of detail for brevity. The IC 750 of this example, having two configuration pins, is compatible with the carrier arrangements depicted in FIGS. 3 and 4. The first and second configuration circuitry 755-1, 755-2 are respectively configured to determine the resistance values between the respective pins 751, 752 and a reference voltage (VCC or GND). The IC 750 may comprise one or more resistors or resistive networks. At least one of the configuration circuitry 755-1, 755-2 may comprise a resistor. The controller 760 is in communication with the configuration circuitry 755-1, 755-2 and is configured to place the IC 750 into a state or configuration according to the determined resistance value as described above with reference to FIG. 6. As for the IC 650 of FIG. 6, the controller 760 is configured to select a configuration mode for the IC 650 based on the resistance value determined by the configuration circuitry 755-1, 755-2, the configuration mode being one of an internal configuration mode in which the IC 650 is configured based on data stored in the IC 650, and an external configuration mode in which the IC 650 is configured based on data read from an external memory device coupled to the configuration pins 751, 752.

As described above with reference to FIG. 3, when the controller 760 detects a first (pullup or pulldown) resistance at each configuration pin 751, 752 it may load a configuration (or state) from the (external) memory device and configure the IC 750, external device and/or the wider system according to that retrieved configuration.

As described above with reference to FIG. 4, when the controller 760 detects a first pullup resistance at each pin 751, 752, for example, corresponding to a state in which the switches are closed (so the detected resistance at each pin will be the value of the first and second resistors), it may load a first configuration (or state) from the (external) memory device and configure the IC 750 according to that first retrieved configuration. When the controller 760 detects a second pullup resistance at each pin 751, for example, corresponding to a state in which the switches are open (so the detected resistance at each configuration pin will be, respectively, the sum of the first and third, and second and fourth, resistors as the second and fourth resistors 510-2, 510-4 are respectively in series with the first and third resistors 510-1, 510-3 when the switches are open), it may load a second configuration (or state) from the (external) memory device and configure the IC 750 according to that first retrieved configuration. Of course, referring to Table 1 above and the following paragraphs, other states (corresponding to other resistances detected at the first and second configuration pins 751, 752) in which one or more of the resistors connected to a first configuration pin may be pullup resistors and one or more other resistors connected to a second configuration pin may be pulldown resistors, and one switch may be closed while the other is open etc., may give rise to other resistance values being detected at each pin 751, 752 which will cause another configuration to be retrieved and loaded to the IC 750.

Figure 10:
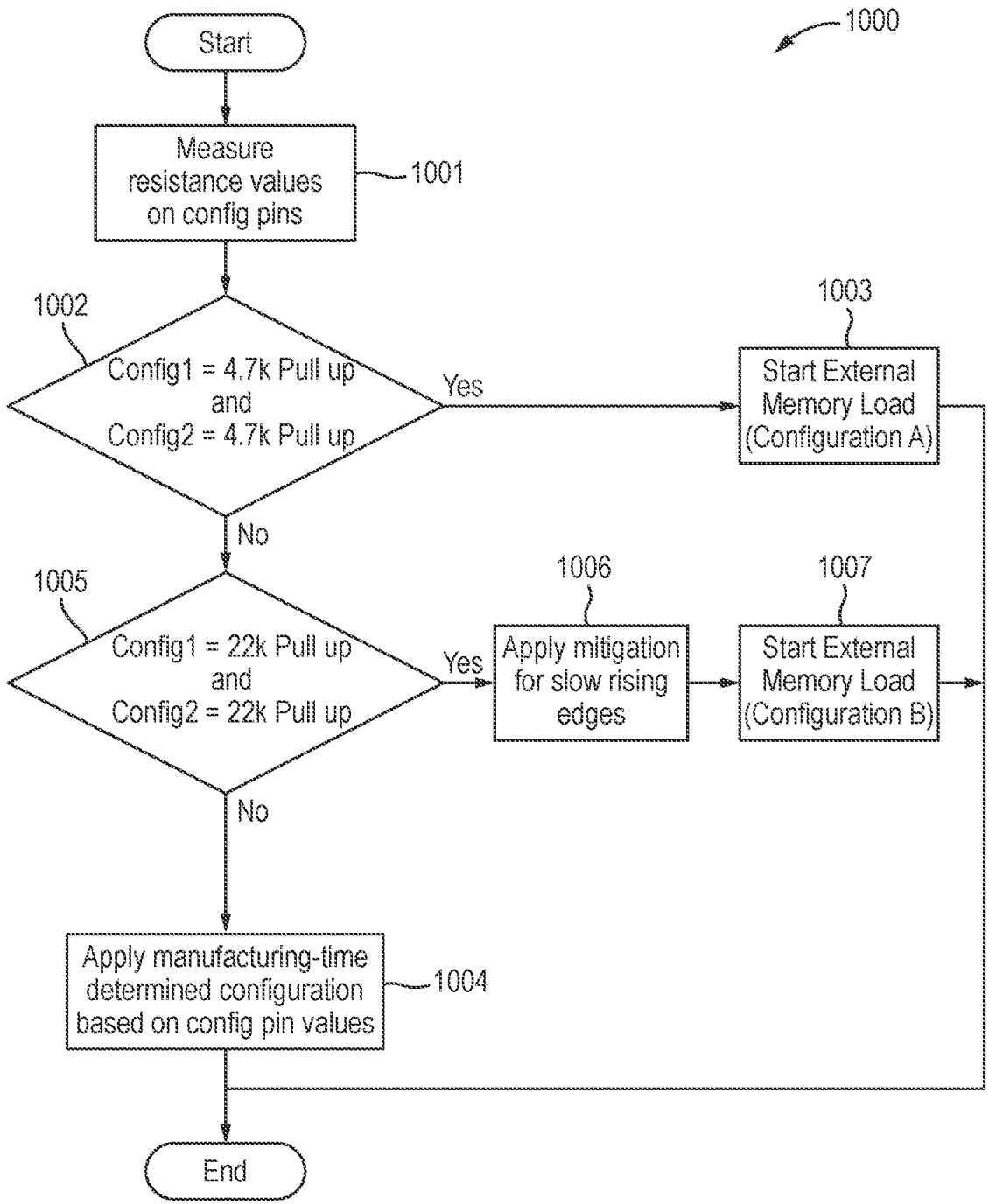

FIG. 10 shows a process 1000 that the IC 750 may be configured to perform, where like blocks are depicted with like reference numerals compared to FIGS. 8 and 9. Like the process of FIG. 9, at block 1002, it is determined whether a first pullup resistance (4.7 kΩ in this example) is detected, but according to this process, block 1002 determines whether the first pullup resistance is detected at each of the two configuration pins 751, 752 and, if so, the controller 770 loads and installs a first configuration ("Configuration A") from the external memory. At block 1005, it is determined whether a second pullup resistance (22 kΩ in this example) is detected at each of the two configuration pins 751, 752 and, if so, the controller 770 loads and installs a second configuration ("Configuration B") from the external memory. Note that the values of 4.7 kΩ and 22 kΩ being detected at the pins are used purely for exemplary purposes. It will be understood that these values could correspond to resistance values other than 4.7 kΩ and 17.3 kΩ, and may be pullup or pulldown resistances. For example, the resistance value(s) may be any of the ones depicted in FIG. 1a. It will also be appreciated that the values of the first and second, and third and fourth, resistance values may not be equal such that when both switches are closed or open, the resistance values detected at each of the pins 751, 752, could be different, as described above.

Referring to blocks 906 and 1006, typical I$^2$C bus drivers are of the "open drain" type, meaning that they may pull their signal lines low but may not be able to drive them high. As such, a weaker resistive pullup (such as when 22 kΩ is detected at the pin or pins in some of the above examples) resulting in the second configuration (Configuration B) being loaded from the external memory device, this may produce slower rising edges of the data interface. However, these may be mitigated as any of the ICs above may be configured to use the detected resistor value to determine the speed that the interface should be driven at, and may be configured to reduce that speed when a weaker pullup is detected. Alternatively, the IC may be configured to, if the detected resistor value was above a certain threshold, enable an internal current source which would improve the speed of the rising edges of the data interface. In other words, the IC may be configured to slow the speed of the interface or generate an internal supplement of current on one of the paths and add this to the path or paths to mitigate any loss of speed (so that there is no noticeable loss of speed). In other examples, the integrated circuit may be configured to increase and/or decrease the frequency at which one or both of the lines is driven to mitigate slow rising edges of the interface.

It will be appreciated that this disclosure provides one or more (pullup or pulldown) resistors connected to, or coupled to, the output node of a memory device. The one or more (pullup or pulldown resistors) may be referred to as a "resistive network" given the choice available to an OEM or IC manufacturer. It will be appreciated that the resistive network, although depicted as being part of the carrier in the figures, could equally be part of the external memory device Alternatively, an arrangement may comprise at least one of the carrier, external memory, and IC (e.g. as described above) and a resistive network, wherein at least one of the carrier and external memory comprises at least one resistor of the resistive network. Put another way, some resistors may be provided on the carrier and some may be provided as part of the external memory, depending on the example. The IC may comprise an internal resistor which may be connected between the configuration pin of the IC and to one of the source of positive voltage, e.g. connected to whichever one of the source of positive voltage or source of negative voltage to which one or more external (to the IC) resistors are connected. Any such internal resistor may be part of the configuration circuit.

It will be appreciated that this disclosure allows greater flexibility in configuring a device, such as a pin-constrained device like an integrated circuit, as the advantage of an external memory is that the number of configuration options is not limited to a set number of predefined configurations. The present disclosure provides an arrangement where an external memory device can be used without requiring an additional pin (for example compared to using a resistive detection scheme). For example, as explained above with reference to FIG. 1a, an OEM or IC manufacturer may select one of a number of resistors, and choose whether this is to be configured as a pullup or pulldown resistor, and this sets a configuration option for the integrated circuit, using one of the IC's configuration pins to do so. If greater configuration flexibility were allowed a further configuration pin may need to be used (for example connected to another resistor or to an external memory) whereas the present disclosure provides such greater configuration flexibility without requiring an additional configuration pin. As such, when the IC detect a certain resistance coupled to it's configuration pin this triggers the IC to load a particular configuration from the external memory (a "stored configuration"), and a designer and/or OEM or IC manufacturer has the flexibility to set what this configuration is. As such, the stored configuration may be loaded by the designer and/or OEM manufacturer and this will be installed on the IC when a particular pullup or pulldown resistance is detected across the IC's configuration pin. It will be appreciated that the arrangements disclosed herein provide the advantages of both resistive pin detection and external memory loading in a simple, effective, arrangement. The arrangements herein can utilise the fact that an interface to an external memory may use one (or more) data lines that are pulled high by a resistor, and that resistor can be chosen according to one of the configuration options shown in FIG. 1a. In the examples where the IC comprises one configuration pin (in the sense that one "free" pin is available for the IC's configuration; the skilled person will appreciate that the IC will comprise other pins for other purposes) the interface on the IC may be single-wire interface, however the examples where the IC comprises two pins (as before, two "free" pins available for the IC's configuration) may be used with an I$^2$C interface.

As will be understood by those of ordinary skill in the art, the term "circuitry" as herein used may comprise any and all combinations of analogue and/or digital hardware circuit(s), firmware and/or software, including any and all blocks, modules, programs and/or flow diagrams and the like, that could result in the same required output, functionality and/or result. Furthermore, the "circuitry" may also be implemented as, and/or in, an integrated circuit (IC) that may be incorporated in a host device.

The term host device is used in this specification to refer to any electronic or electrical device which is removably connectable to an external accessory apparatus. The host device may especially be a portable and/or battery powered host device such as a mobile telephone, an audio player, a video player, a PDA, a mobile computing platform such as a personal computer (PC), laptop computer or tablet and/or a games device for example.

The skilled person will thus recognise that some aspects of the above-described circuitry, apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments as herein described may be implemented on a DSP (Digital Signal Processor), ASIC (Application Specific Integrated Circuit) and/or FPGA (Field Programmable Gate Array). Thus, any code may comprise conventional program code or microcode or, for example code for setting up or controlling an ASIC or FPGA. Any code may also comprise code for dynamically configuring re-configurable circuitry and/or apparatus such as re-programmable logic gate arrays. Similarly, any code may comprise code for a hardware description language such as Verilog™ or VHDL (Very high-speed integrated circuit Hardware Description Language). As the skilled person will appreciate, any code may be distributed between a plurality of coupled components in communication with one another. Where appropriate, the embodiments herein described may also be implemented using code running on a field-(re) programmable analogue array or similar device in order to configure analogue hardware.

It should be noted that the above-mentioned embodiments illustrate rather than limit any invention herein contained, and that those skilled in the art will be able to design many alternative embodiments without departing from the scope of the appended feature statements and/or claims. The word "comprising" does not exclude the presence of elements or steps other than those listed in a feature statement and/or claim, "a" or "an" does not exclude a plurality, and a single feature or other unit may fulfil the functions of several units recited in the feature statements and/or claims. Any reference numerals or labels in the feature statements and/or claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

The invention claimed is:

1. A configurable integrated circuit comprising:
a configuration pin for coupling with an external memory device;
configuration circuitry to determine a resistance value between the configuration pin and a reference voltage; and
a controller configured to select a configuration mode for the integrated circuit based on the resistance value determined by the configuration circuitry, the configuration mode being one of an internal configuration mode in which the integrated circuit is configured based on data stored in the integrated circuit, and an external configuration mode in which the integrated circuit is configured based on data read from an external memory device coupled to the configuration pin.

2. The configurable integrated circuit of claim 1 wherein the reference voltage is a positive voltage.

3. The configurable integrated circuit of claim 1, further comprising an I²C interface connected between the configuration pin and the controller.

4. The configurable integrated circuit of claim 3, wherein the controller is configured to at least one of: (i) determine and adjust the speed at which the interface should be driven based on the resistance value determined by the configuration circuitry, (ii) enable an internal source of current and cause the current on an external path connected to the configuration pin to be supplemented with the internal source of current, and (iii) change the frequency at which a line connected to the configuration pin is driven.

5. The configurable integrated circuit of claim 1, wherein the controller is configured to select between two configuration modes, each based on data read from the external memory device, based on the resistance value determined by the configuration circuitry.

6. The configurable integrated circuit of claim 1 wherein the configuration pin is a first configuration pin and the integrated circuit further comprises a second configuration pin for coupling with an external memory device, wherein the configuration circuitry is configured to determine a resistance value between each configuration pin and the reference voltage.

7. The configurable integrated circuit of claim 5 wherein the first configuration pin comprises a SDA pin and wherein the second configuration pin comprises a SCL pin.

8. The configurable integrated circuit of claim 5, wherein the controller is configured to select between two configuration modes, each based on data read from the external memory device, based on the resistance value determined by the configuration circuitry between each configuration pin and the reference voltage.

9. The configurable integrated circuit of claim 1, wherein configuring the integrated circuit based on data read from an external memory device comprises setting or changing the sample rate of the IC, selecting one of a number of filter options, setting or changing an output frequency of a clock generator, setting an address of the integrated circuit, and permitting and/or preventing access to subset of address ranges of the integrated circuit.

10. An arrangement comprising a carrier and an integrated circuit, the carrier comprising:
 a positive voltage rail;
 a negative voltage rail;
 a memory device coupled to the positive and negative voltage rails and comprising an output node;
 a first resistor coupled between one of said positive or negative voltage rails and the output node of the memory device; and
 a first path connecting the output node of the memory with the integrated circuit, and wherein the integrated circuit comprises
 a first configuration pin coupled to an external memory device via the first path;
 configuration circuitry to determine a resistance value between the configuration pin and a reference voltage; and
 a controller configured to select a configuration mode for the integrated circuit based on the resistance value determined by the configuration circuitry, the configuration mode being one of an internal configuration mode in which the integrated circuit is configured based on data stored in the integrated circuit, and an external configuration mode in which the integrated circuit is configured based on data read from the external memory device coupled to the configuration pin.

* * * * *